(12) United States Patent
Kim et al.

(10) Patent No.: US 7,729,442 B2
(45) Date of Patent: Jun. 1, 2010

(54) METHOD AND SYSTEM FOR TRANSMITTING DATA IN A COMMUNICATION SYSTEM

(75) Inventors: Sung-Jin Kim, Suwon-si (KR); Ho-Jin Kim, Seoul (KR); Ju-Ho Lee, Suwon-si (KR); Hwan-Joon Kwon, Hwaseong-si (KR); Jianjun Li, Yongin-si (KR); Yong-Xing Zhou, Yongin-si (KR); In-Soo Hwang, Gyeongsan-si (KR); Kwang-Bok Lee, Seoul (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 794 days.

(21) Appl. No.: 11/590,015

(22) Filed: Oct. 31, 2006

(65) Prior Publication Data

US 2007/0160162 A1 Jul. 12, 2007

Related U.S. Application Data

(60) Provisional application No. 60/731,951, filed on Oct. 31, 2005.

(30) Foreign Application Priority Data

Jul. 27, 2006 (KR) .................... 10-2006-0070866

(51) Int. Cl.
*H04L 27/00* (2006.01)
(52) U.S. Cl. ...................... 375/295; 375/267

(58) Field of Classification Search .............. 375/260, 375/267, 299, 144, 133, 141, 148, 349, 347; 370/208–210
See application file for complete search history.

(56) References Cited

U.S. PATENT DOCUMENTS

| | | | |
|---|---|---|---|
| 2003/0035491 A1* | 2/2003 | Walton et al. | 375/267 |
| 2005/0129137 A1* | 6/2005 | Yamada et al. | 375/267 |
| 2006/0039489 A1* | 2/2006 | Ikram et al. | 375/260 |
| 2007/0041464 A1* | 2/2007 | Kim et al. | 375/267 |
| 2007/0066332 A1* | 3/2007 | Zhang et al. | 455/513 |
| 2007/0291638 A1* | 12/2007 | Chae et al. | 370/208 |
| 2008/0108310 A1* | 5/2008 | Tong et al. | 455/69 |

FOREIGN PATENT DOCUMENTS

| | | |
|---|---|---|
| JP | 2002-217752 | 8/2002 |
| KR | 1020040046322 | 6/2004 |
| KR | 1020050066633 | 6/2005 |

* cited by examiner

*Primary Examiner*—Emmanuel Bayard
(74) *Attorney, Agent, or Firm*—The Farrell Law Firm, LLP

(57) ABSTRACT

A method and system are provided for transmitting data in a multiple-input multiple-output (MIMO) communication system. A receiver sets the number of sub-streams of each column of a preceding matrix with respect to all preceding matrices of channels formed between the receiver and a transmitter and measures channel states with respect to sub-stream combinations whose number is equivalent to the number of set sub-streams. The receiver transmits data according to channel states to the transmitter after measuring the channel states with respect to the sub-stream combinations and antenna combinations representing sub-streams used upon data transmission of all the preceding matrices.

22 Claims, 5 Drawing Sheets

METHOD AND SYSTEM FOR TRANSMITTING DATA IN A COMMUNICATION SYSTEM

PRIORITY

This application claims priority under 35 U.S.C. §119 to an application filed in the United States Patent and Trademark Office on Oct. 31, 2005 and assigned Ser. No. 60/731,951 and an application filed in the Korean Intellectual Property Office on Jul. 27, 2006 and assigned Serial No. 2006-70866, the contents of which are incorporated herein by reference.

BACKGROUND OF THE INVENTION

1. Field of the Invention

The present invention generally relates to a communication system, and more particularly to a method and system for transmitting data in a multiple-input multiple-output (MIMO) communication system.

2. Description of the Related Art

A large amount of research is being conducted to provide users with services based on various Qualities of Service (QoS) at a high rate in next-generation communication systems. In the next-generation communication system, active research is being conducted to support a high-speed service for ensuring mobility and QoS in broadband wireless access (BWA) communication systems such as wireless local area network (LAN) and metropolitan area network (MAN) communication systems. The typical communication systems are Institute of Electrical and Electronics Engineers (IEEE) 802.16a/d and 802.16e communication systems.

The IEEE 802.16a/d and 802.16e communication systems apply an Orthogonal Frequency Division Multiplexing/Orthogonal Frequency Division Multiple Access (OFDM/OFDMA) scheme to a physical channel of the wireless MAN system in order to support a broadband transmission network. The IEEE 802.16a/d communication system considers a state in which a subscriber station (SS) is fixed. That is, the IEEE 802.16a/d communication system does not consider SS mobility, and considers only a single cell structure. However, the IEEE 802.16e communication system is used to support SS mobility in the IEEE 802.16a communication system. An SS with mobility is referred to as a mobile station (MS).

However, data transmission error and loss of information may occur due to many factors such as multipath interference, shadowing, propagation attenuation, time variant noise, and interference fading in wireless channel environments of the next-generation communication systems, which are different from wired channel environments. Various error control techniques according to channel characteristics are used to reduce the information loss. Further, diversity schemes are used to eliminate communication instability due to the fading. The diversity schemes can be divided into time, frequency and antenna diversity schemes.

The antenna diversity schemes use multiple antennas and are divided into a receive antenna diversity scheme using multiple receive antennas, a transmit antenna diversity scheme using multiple transmit antennas, and a multiple-input multiple-output (MIMO) scheme using multiple receive antennas and multiple transmit antennas.

The MIMO communication system can obtain high transmission gain using transmit antenna diversity or spatial multiplexing diversity. The transmit antenna diversity scheme and the spatial multiplexing diversity scheme have different transmission gains according to actually applied channel states. When a transmitter transmits signals through multiple transmit antennas, the transmission gain differs according to whether a transmission path of a transmit antenna weight is an open or closed loop.

A closed-loop MIMO communication system in a multiuser environment can obtain multiuser diversity gain according to Channel Quality Information (CQI), for example, Signal to Interference and Noise Ratios (SINRs), fed back from users or receivers according to data streams of precoding matrices thereof. That is, the receivers need a scheme for computing the SINRs on a data stream-by-data stream basis and feeding back the CQI mapped to the SINRs to the transmitter. That is, when the receivers feed back the CQI to the transmitter, the multiuser diversity gain can be sufficiently obtained. When the CQI is fed back, overhead can be reduced. In particular, a data transmission method is required which can ensure the above-described multiuser diversity and can prevent an increase in overhead even when the number of users or receivers increases.

In the above-described closed-loop MIMO communication system, data transmission and reception between a transmitter, i.e., a base station (BS), and a receiver, i.e., a mobile station (MS), are performed according to the channel environment formed between the MS and the BS. In other words, in the MIMO communication system, the MS measures a channel environment, i.e., a channel state, related to the BS and transmits CQI to the BS according to the measured result. The BS transmits data to and receives data from the MS according to CQI received the MS.

Therefore, the MIMO communication system needs a method for efficiently transmitting data when the number of users or MSs located within a cell covered by an arbitrary BS and states of channels formed by multiple antennas provided in a transceiver are variable. There is a problem in that data transmission/reception efficiency and system performance degrade when the number of MSs located within the cell of the MIMO communication system is variable, and a state of a channel formed by a particular antenna of the multiple antennas provided in the transceiver is worse in comparison with channel states of the other antennas, or a rank of a channel matrix formed by multiple transmit and receive antennas is bad.

SUMMARY OF THE INVENTION

Accordingly, the present invention has been designed to solve the above and other problems occurring in the prior art. Therefore, it is an object of the present invention to provide a method and system for transmitting data in a communication system.

It is another object of the present invention to provide a method and system for transmitting data in a multiple-input multiple-output (MIMO) communication system.

It is yet another object of the present invention to provide a method and apparatus that can efficiently transmit data even when the number of users located within a cell of a MIMO communication system is small or a channel state of a particular antenna is bad.

In accordance with an aspect of the present invention, there is provided a method for transmitting data at a receiver in a communication system. The method includes setting the number of sub-streams of each column of a preceding matrix with respect to all precoding matrices of channels formed between the receiver and a transmitter; measuring channel states with respect to sub-stream combinations whose number is equivalent to the number of set sub-streams; and transmitting data according to channel states to the transmitter after measuring the channel states with respect to the sub-stream combinations and antenna combinations representing sub-streams used upon data transmission of all the precoding matrices.

In accordance with another aspect of the present invention, there is provided a method for transmitting data at a transmitter in a communication system. The method includes receiving channel quality information related to sub-stream combinations and antenna combinations from multiple receivers; retrieving a maximal value of sub-streams from channel state values comprised in the received channel quality information and computing all data transmission rates of the sub-streams; and transmitting data to the multiple receivers using a sub-stream combination index and a precoding matrix index after setting the sub-stream combination index according to a maximal transmission rate among all the computed data transmission rates of the sub-streams and setting the precoding matrix index according to the set sub-stream combination index.

In accordance with another aspect of the present invention, there is provided a system for transmitting data in a communication system. The system includes a receiver for setting the number of sub-streams of each column of a precoding matrix with respect to all precoding matrices of channels formed between the receiver and a transmitter and measuring channel states with respect to sub-stream combinations whose number is equivalent to the number of set sub-streams, and transmitting data according to channel states to the transmitter after measuring the channel states with respect to the sub-stream combinations and antenna combinations representing sub-streams used upon data transmission of all the precoding matrices.

In accordance with yet another aspect of the present invention, there is provided a system for transmitting data in a communication system. The system includes a transmitter for receiving channel quality information related to sub-stream combinations and antenna combinations from multiple receivers, scanning a maximal value of sub-streams from channel state values comprised in the received channel quality information, computing all data transmission rates of the sub-streams, and transmitting data to the multiple receivers using a sub-stream combination index and a precoding matrix index after setting the sub-stream combination index according to a maximal transmission rate among all the computed data transmission rates of the sub-streams and setting the precoding matrix index mapped to the set sub-stream combination index.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, detailed descriptions of functions and configurations incorporated herein that are well known to those skilled in the art are omitted for clarity and conciseness. It is to be understood that the phraseology and terminology employed herein are for the purpose of description and should not be regarded as limiting the present invention.

The present invention provides a method and system for transmitting data in a communication system. In the present invention, a method and system for transmitting data in a multiple-input multiple-output (MIMO) communication system, for example, a per-user unitary rate control (PU$^2$RC) communication system, are provided. Herein, an example of the PU$^2$RC communication system serving as the MIMO communication system will be described in the present invention. Of course, the data transmission method and system of the present invention can be applied also to other communication systems.

Furthermore, the present invention provides a method for transmitting data between a transmitter, for example, a base station (BS), with multiple transmit antennas and a receiver, for example, a mobile station (MS), with multiple receive antennas by transmitting and receiving feedback information, for example, Channel Quality Information (CQI). In the present invention as described below, a method and system for transmitting data in the MIMO communication system of a multiuser environment where multiple MSs with multiple receive antennas are located within a cell covered by the BS are provided. In this case, the receivers measure states of data streams received from the transmitter, measure, for example, Signal to Interference and Noise Ratios (SINRs), and provide the transmitter with CQI mapped to the measured SINRs. The transmitter transmits and receives data according to received CQI.

In addition, the present invention provides a method and system for efficiently transmitting data when the number of MSs located within the cell of the MIMO communication system is variable, a state of a channel formed by a particular antenna of the multiple antennas provided in the transceiver is worse in comparison than channel states of the other antennas, or a rank of a channel matrix formed by multiple transmit and receive antennas is bad. In the present invention as described below, a data transmission method and system that can improve system performance by reducing an amount of CQI from multiple MSs to the BS and efficiently transmitting and receiving data between the BS and the MSs according to CQI in the MIMO communication system are provided. A structure of a communication system in accordance with the present invention will be described with reference to FIG. 1.

Figure 1:
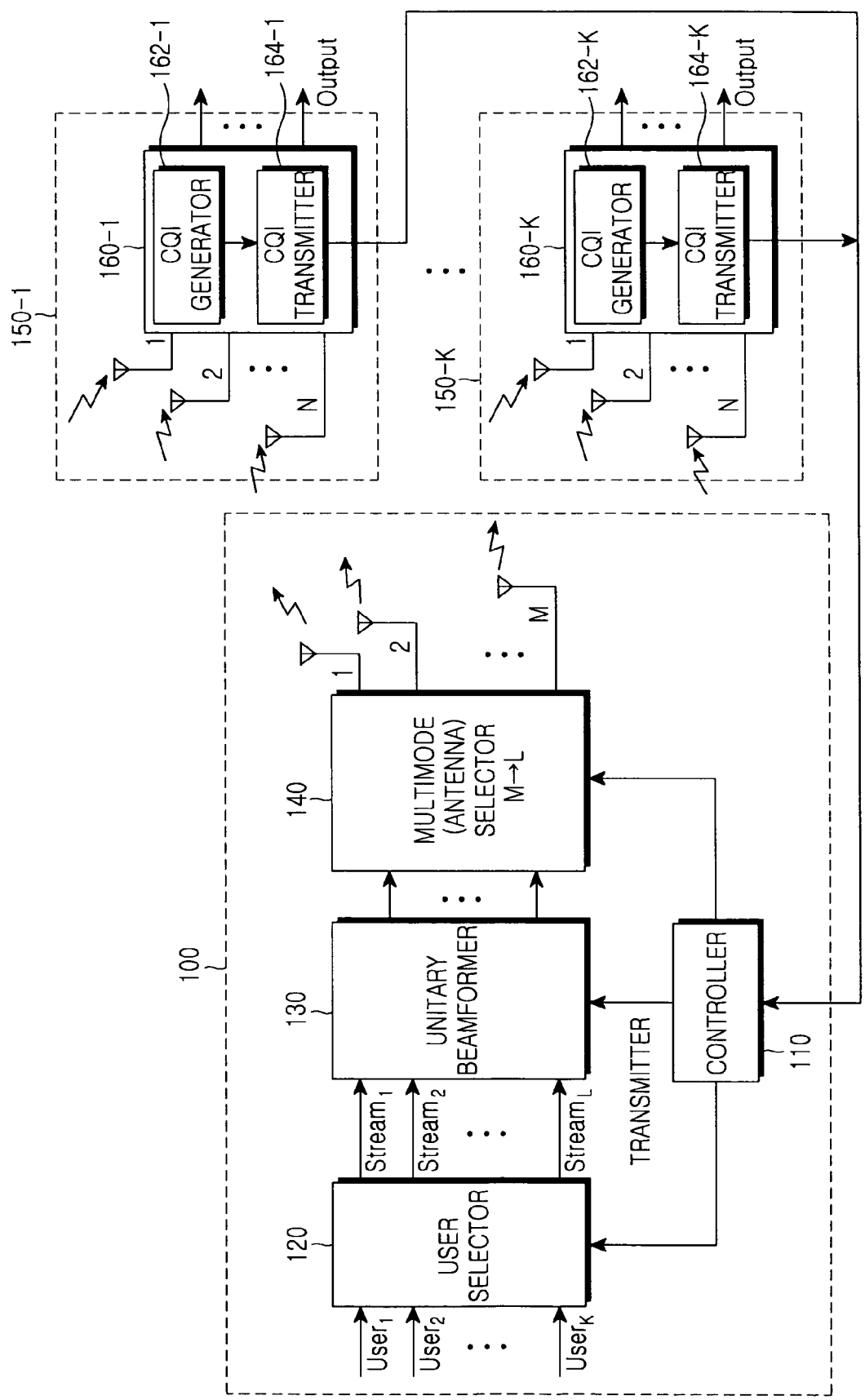
FIG. 1 is a block diagram illustrating a structure of a communication system in accordance with the present invention.

FIG. 1 is a block diagram illustrating the communication system structure in accordance with the present invention. Herein, for convenience of explanation, it is assumed that the communication system of FIG. 1 includes a transmitter having M transmit antennas and K receivers respectively having N receive antennas.

Referring to FIG. 1, the transmitter 100 provides the receivers 150-1 to 150-K with data using transmission precoding-matrices for spatial multiplexing and rate adaptation.

A controller 110 outputs feedback information, i.e., CQI, received from the receivers 150-1 to 150-K to a user selector 120, a unitary beamformer 130 and a multimode selector 140. The user selector 120 selects data streams related to User$_1$, User$_2$, . . . , User$_k$ to be transmitted to the receivers 150-1 to 150-K on a user-by-user, i.e., receiver-by-receiver basis and transmits the selected data streams to the unitary beamformer 130. The unitary beamformer 130 maps the data streams provided from the user selector 120 to the precoding matrices according to feedback information and then outputs the mapped data streams to the multimode selector 140. The precoding matrices are equally set according to user sub-set selection.

The user selector 120 selects a user sub-set from K-user data according to index information g of a precoding matrix set defined by user sub-set selection from the users included in the feedback information, i.e., the CQI, transmitted from the receivers 150-1 and 150-K to the controller 110, the number l of sub-streams to be transmitted to the users, and an antenna mapping matrix index p in l sub-streams. The unitary beamformer 130 schedules the users selected by the user selector 120 for multiple transmissions. Then, the unitary beamformer 130 modulates and encodes independent streams in a rate matching process.

In detail, the unitary beamformer 130 performs a precoding process for the data streams output from the user selector 120 using an index of the preceding matrix set predefined by the feedback information, i.e., the CQI, transmitted from the receivers 150-1 to 150-K to the controller 110. Herein, the feedback information, i.e., the CQI, is generated and transmitted from the receivers 150-1 to 150-K. The unitary beamformer 130 uses the CQI upon rate adaptation and sum rate estimation for selecting precoding matrices.

The receivers 150-1 to 150-K include minimum mean square error (MMSE) sections 160-1 to 160-K when an MMSE scheme is used as a multiplexing scheme for detecting and decoding received data in the MIMO communication system. The MMSE sections 160-1 to 160-K include CQI generators 162-1 to 162-K for generating the CQI and CQI transmitters 164-1 to 164-K for transmitting the CQI.

In order to adaptively allocate data streams mapped to precoding matrices in the unitary beamformer 130 according to channel situations, the multimode selector 140 selects precoding matrices for transmitting downlink data to the receivers 150-1 to 150-K from among all preceding matrices mapped to the feedback information, i.e., the CQI, transmitted from the receivers 150-1 to 150-K to the controller 110. In the multimode selector 140, a precoding matrix having a worse channel state as compared with other channel states is off in the channels formed by multiple transmit and receive antennas.

To obtain transmit diversity through the spatial multiplexing scheme in the MIMO communication system, the transmitter 100 receives the CQI from the receivers 150-1 to 150-K. When receiving the CQI, the transmitter 100 transmits the data streams to the receivers 150-1 to 150-K using G precoding matrices. The receivers 150-1 to 150-K measure stream-by-stream SINRs from the received data streams, generate CQI, and provide the CQI to the transmitter 100 as described above.

In this case, the receivers 150-1 to 150-K receive the data streams using a non-linear Successive Interference Cancellation (SIC) or MMSE scheme. For convenience of explanation, in the present invention, it is assumed that the receivers 150-1 to 150-K receive the data streams using the MMSE scheme. The receivers 150-1 to 150-K transmit feedback information of a precoding matrix index g and a vector index $v_m^{(g)}$ (where m=1, M and g=1, . . . , G) to the transmitter 100 through an allocated uplink channel, respectively. The feedback information is transmitted to the user selector 120, the unitary beamformer 130 and the multimode selector 140 through the controller 110 of the transmitter 100. The feedback information is used for a data stream transmission and Adaptive Modulation and Coding (AMC).

Herein, the operations of the unitary beamformer 130 and the multimode selector 140 will be described in detail.

The unitary beamformer 130 transmits data streams using precoding matrices. Herein, the precoding matrices are W. A codebook related to the precoding matrices W is preset between the transmitter 100 and the receivers 150-1 to 150-K. Thus, the transmitter 100 and the receivers 150-1 to 150-K can know the codebook related to the precoding matrices W. When transmitting the feedback information to the transmitter 100, the receivers 150-1 to 150-K measure SINRs using all combinations of index information g of a precoding matrix set of users, the number l of transmission sub-streams and an antenna mapping matrix index p in the sub-streams, generate feedback information, i.e., CQI, and provide the CQI to the transmitter 100. The transmitter 100 groups data streams to be transmitted to the receivers 150-1 to 150-K on a precoding matrix-by-precoding matrix, i.e., W-by-W basis. At this time, the receivers 150-1 to 150-K measure SINRs with respect to all precoding matrices W and then select a precoding matrix W having a maximum SINR from among the measured SINRs. In this case, each of the receivers 150-1 to 150-K can select only one precoding matrix W having the maximum SINR. Alternatively, each of the receivers 150-1 to 150-K can select a precoding matrix W having an SINR of more than a predefined threshold according to the communication environment.

For example, when 4 precoding matrices $W_1 \sim W_4$ are present in the MIMO communication system with 4 transmit antennas (4TX) and 4 receive antennas (4RX) and 100 receivers are located within a cell, the transmitter 100 sequentially arranges receivers in which the precoding matrices. $W_1 \sim W_4$ are selected. The receivers in which the precoding matrices $W_1 \sim W_4$ are selected are arranged in each column thereof. In data streams grouped on the precoding matrix-by-precoding matrix, i.e., W-by-W basis, beamforming vectors are referred to as ranks.

Herein, the number of rows is the number of transmit antennas and the number of columns is the number of data streams. Contention occurs when data streams arranged in the precoding matrices W are transmitted to the receivers. A data stream related to a precoding matrix W having a maximum SINR included in CQI transmitted from the receiver is selected. A modulation/demodulation scheme is selected according to selected data stream. The data stream is mapped to the precoding matrix W having the maximum SINR. The unitary beamformer 130 forms beamforming vectors, i.e., ranks, mapped to SINRs included in the feedback information, i.e., the CQI, transmitted from the receivers, maps data streams to precoding matrices W having maximum SINRs, and transmits the data streams to the multimode selector 140.

The multimode selector 140 detects a sub-stream having a bad channel state, i.e., a small SINR included in the CQI, excludes the detected sub-stream, sets data streams of the remaining sub-streams, and transmits the set data streams to the receivers.

Figure 2:
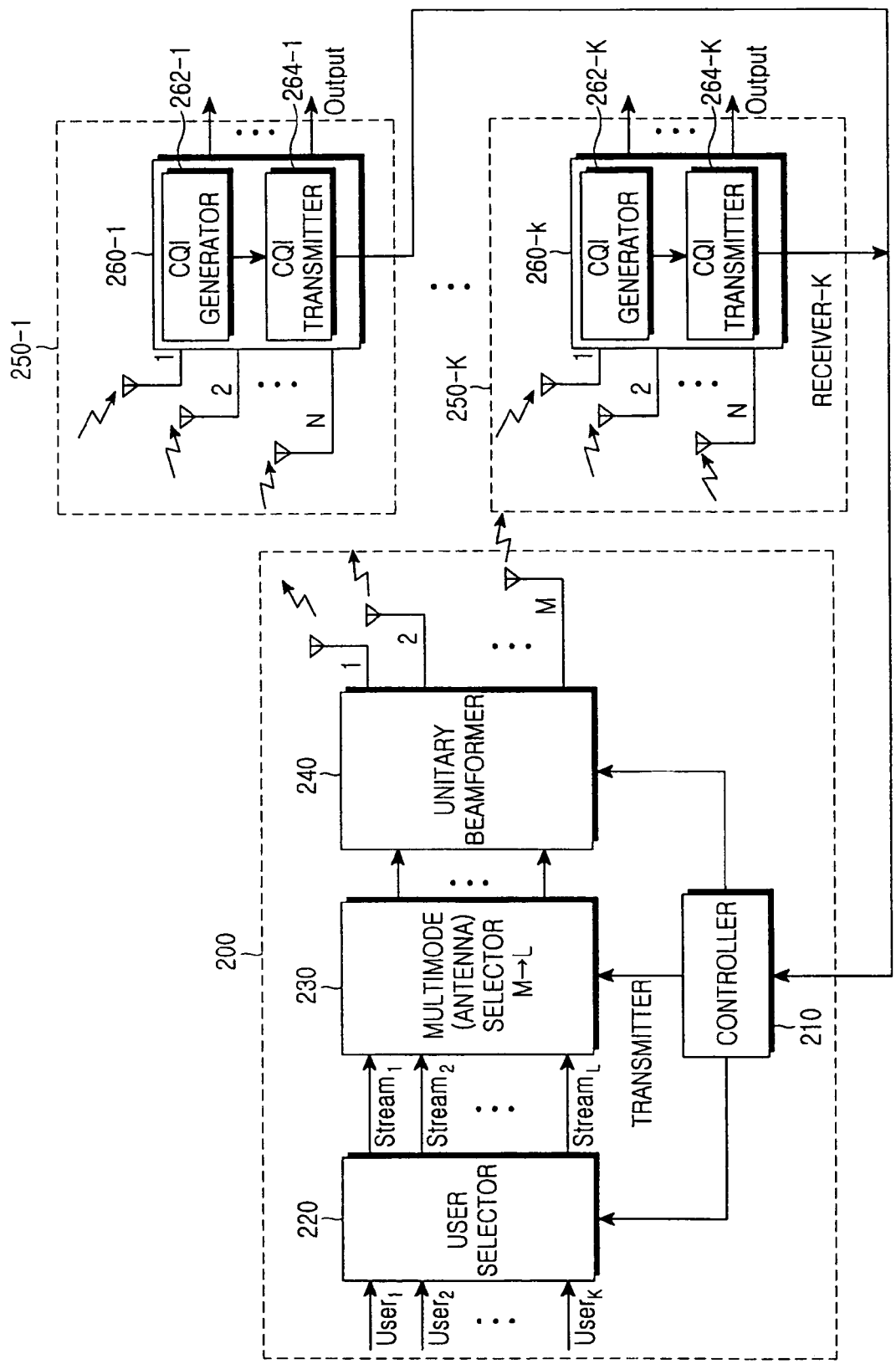
FIG. 2 is a block diagram illustrating a structure of another communication system in accordance with the present invention.

FIG. 2 is a block diagram illustrating a structure of another communication system in accordance with the present invention. For convenience of explanation, it is assumed that the communication system of FIG. 2 includes a transmitter with M transmit antennas and K receivers with N receive antennas.

Referring to FIG. 2, the transmitter 200 includes a controller 210, a user selector 220, a multimode selector 230, and a unitary beamformer 240. The controller 210 receives feedback information, i.e., CQI, from receivers 250-1 to 250-K. According to feedback information transmitted from the controller 210, the user selector 220 selects data streams related to User$_1$, User$_2$, ..., User$_k$ to be transmitted to the receivers 250-1 to 250-K on a user-by-user, i.e., receiver-by-receiver basis. The multimode selector 230 detects beamforming vectors, i.e., ranks, of precoding matrices (W) mapped to the data streams selected by the user selector 220 according to feedback information transmitted from the controller 210. According to feedback information transmitted from the controller 210, the unitary beamformer 240 maps the data streams output from the multimode selector 230 and transmits the data streams to the receivers 250-1 to 250-K. In the multimode selector 230, a rank related to a bad channel state is off and data streams are allocated only for the remaining ranks when a channel state is bad due to a small number of receivers within a cell or when a rank related to a small SINR included in the feedback information, i.e., the CQI, is present. The unitary beamformer 240 selects a rank related to a maximum SINR from unitary precoding matrices allocated on a data stream-by-data stream basis and transmits data to the receivers 250-1 to 250-K using selected ranks. Because the components of the transmitter 200 and the receivers 250-1 to 250-K have been described above, a detailed description is omitted. Next, an operation in which the receivers of FIGS. 1 and 2 generate and transmit CQI will be described in detail.

In a communication system in accordance with the present invention, the receivers measure SINRs and generate CQI using all combinations of index information g of a precoding matrix set defined according to user sub-set selection from the users, the number l of transmission streams for transmitting data to the users, a beam mapping matrix index p of l sub-streams, and the number m of sub-streams, i.e., ranks, actually used upon data transmission. That is, the receivers set the number of sub-streams with respect to all precoding matrices, measure SINRs related to column combinations of the set sub-streams, and generate CQI. Further, the receivers measure all SINRs with respect to all antenna combinations (g,m) and all sub-stream combinations (l,p), generate CQI, and transmit the generated CQI to the transmitter. Herein, a precoding matrix index is denoted by g as described above and g=1~G where G is the total number of precoding matrices. The number of transmission sub-streams is denoted by l and l=1~M where M is the total number of transmit antennas. Further, a mapping matrix index related to a column selected from the set sub-streams is denoted by p and p=1~P$_l$, where $$P_l = \binom{M}{l}.$$

The number of actually used sub-streams, i.e., ranks) is denoted by m and m=1~l. Next, an operation in which the transmitter receives the CQI generated from the receivers and transmits data to the receivers will be described in detail.

In a communication system in accordance with the present invention, the transmitter retrieves a maximum SINR according to all combinations of g, l, p and m in scheduling schemes of all K users in CQI received from the receivers and computes a sum rate using the maximum SINR with respect to sub-streams. A combination of g, l and p is computed when the sum rate is a maximum. Herein, the sum rate can be expressed as shown in Equation (1).

$$C_{MM-PU^2RC} = \max_{1 \leq l \leq M, 1 \leq P_l \leq \binom{M}{l}} C_{PU^2RC}(l, P_l) \quad (1)$$

In Equation (1), $C_{PU^2RC}(l,P_l)$ is a data transmission rate in a communication system of a single user environment, i.e., a single-mode PU$^2$RC scheme according to l and P$_l$ and $C_{MM-PU^2RC}(l,P_l)$ is a sum rate in a communication system of a multiuser environment, i.e., a multimode PU$^2$RC system, in accordance with the present invention.

Figure 3:
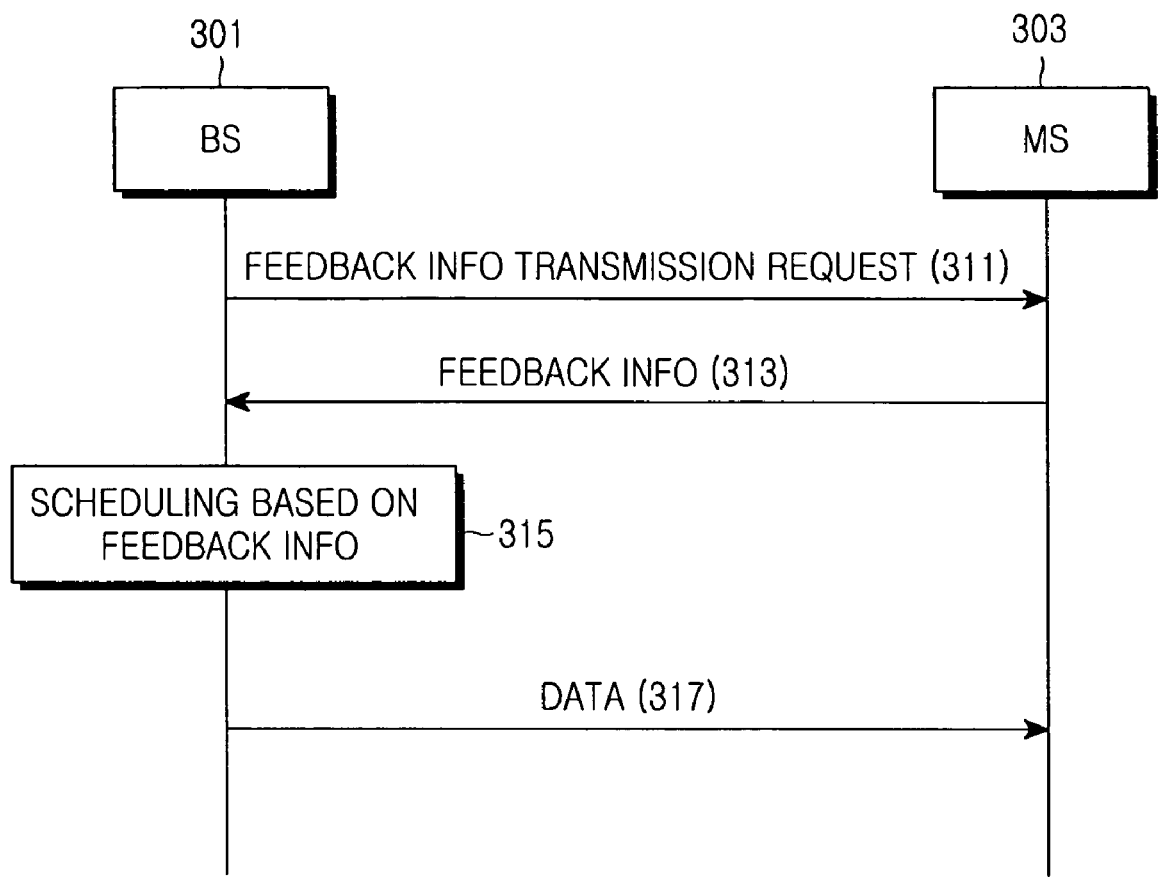
FIG. 3 is a flow diagram illustrating a data transmission/reception process in the communication system in accordance with the present invention.

FIG. 3 is a flow diagram illustrating a data transmission/reception process in the communication system in accordance with the present invention. FIG. 3 illustrates a data transmission/reception flow between a transmitter, i.e., a BS, and a receiver, i.e., an MS, when it is assumed that a small number of receivers, i.e., MSs, for example, 6 or 7 MSs, are located within a cell for convenience of explanation.

Referring to FIG. 3, the BS 301 is notified of user-by-user, i.e., MS-by-MS unitary precoding schemes and requests that the MS 303 transmit feedback information through a control signal, such as a pilot signal, etc., in order to set a transmission sub-stream, i.e., rank for a data transmission, in step 311. In response to the request of the BS 301, the MS 303 measures SINRs and generates CQI using all combinations of index information g of a precoding matrix set defined according to user sub-set selection from the users, the number l of transmission streams for transmitting data to the users, a beam mapping matrix index p of l sub-streams, and the number m of sub-streams, i.e., ranks, actually used upon data transmission and then transmits the generated CQI, i.e., the feedback information, to the BS 301 in step 313.

Then, the BS 301 allocates a precoding matrix having a maximum SINR to the MS 303 according to feedback information received therefrom in step 315. When a sub-stream having a bad channel state is present, the BS 301 excludes the sub-stream having the bad channel state and maps a data stream to a precoding matrix having the maximum SINR to transmit data to the MS 303 in step 317.

In a data transmission/reception method for use in the communication system in accordance with the present invention, the BS 301 can improve system performance or diversity gain by excluding a sub-stream having of a bad state or reducing the number of antennas. When a small number of receivers are located within a cell, a state of a channel formed by a particular transmit/receive antenna of the multiple antennas provided in the transceiver is worse in comparison with channel states of the other antennas, or a state of a sub-stream of a channel matrix is bad.

As illustrated in FIG. 3, the present invention adaptively allocates data streams to be transmitted to the receivers according to rank states, i.e., channel states between the transmitter and the receivers. In order to obtain transmit diversity through spatial multiplexing in the MIMO communication system in accordance with the present invention, the transmitter transmits data streams using precoding matrices and the receivers measure SINRs of the received data streams, generate CQI, and transmit the generated CQI to the transmitter. To maximize the communication system performance, the receivers effectively reduce an amount of CQI, i.e., feedback information, to be transmitted to the transmitter.

When transmitting the CQI of data streams in every case, i.e., in full feedback, an amount of CQI fed back from the receivers can be expressed as shown in Equation (2).

$$O_{Full} = G \sum_{i=l}^{M} \binom{M}{l} l \qquad (2)$$

For example, $O_{Full}=128$ when $G=4$ and $M=4$ in Equation (2). In the case of full feedback, a resource needed to transmit feedback information, i.e., CQI, or an uplink feedback bandwidth increases. To reduce the uplink feedback bandwidth, $P_l$ is fixed and a maximum SINR is measured with respect to all G and M values for each l value. According to measured SINR, CQI is generated and transmitted.

That is, the receiver measures SINRs whose number is equal to the total number of transmit antennas of the transmitter and transmits generated CQI. An amount of CQI fed back from the receiver to the transmitter can be expressed as shown in Equation (3).

$$O_{RF}=M \qquad (3)$$

For example, when $G=4$ and $M=4$ in Equation (3), $O_{RF}=4$. This case can transmit the CQI in a smaller uplink feedback bandwidth in comparison with full feedback. The feedback can be further reduced when using the delta CQI corresponding to a mean value related to a difference between two adjacent CQI values.

Figure 4:
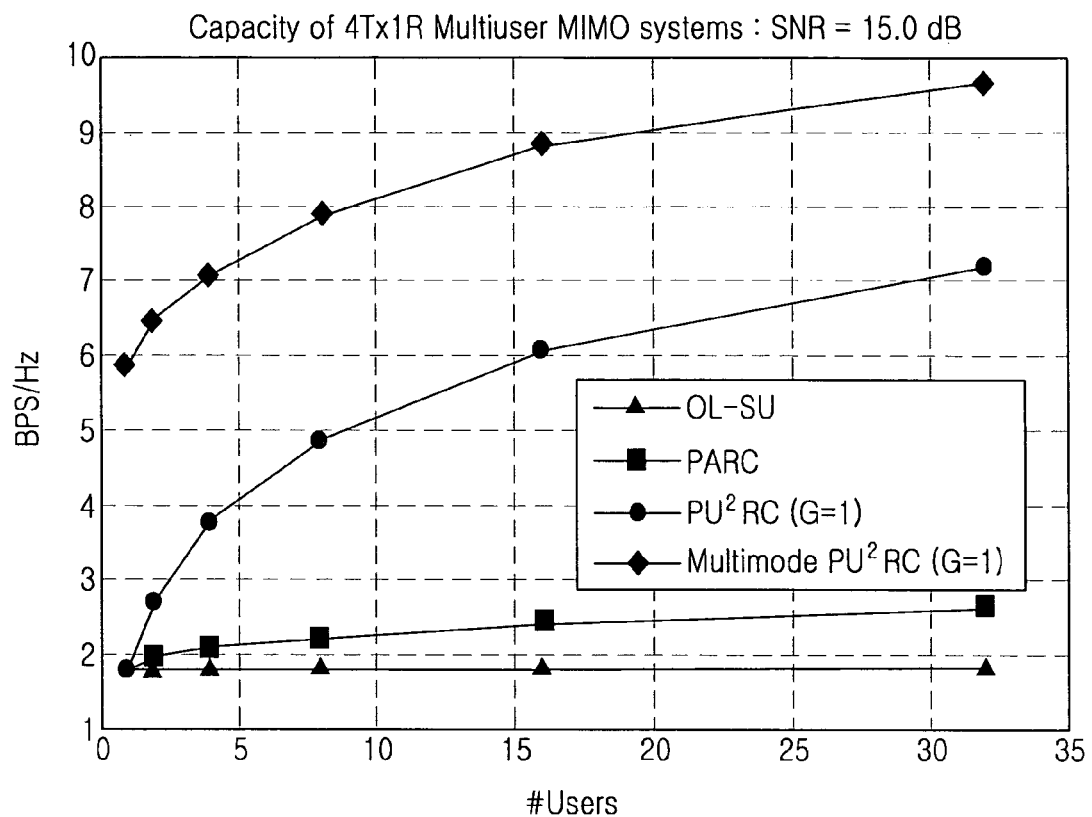
FIG. 4 is a graph illustrating data transmission efficiency according to number of users in a communication system in accordance with the present invention.
Figure 5:
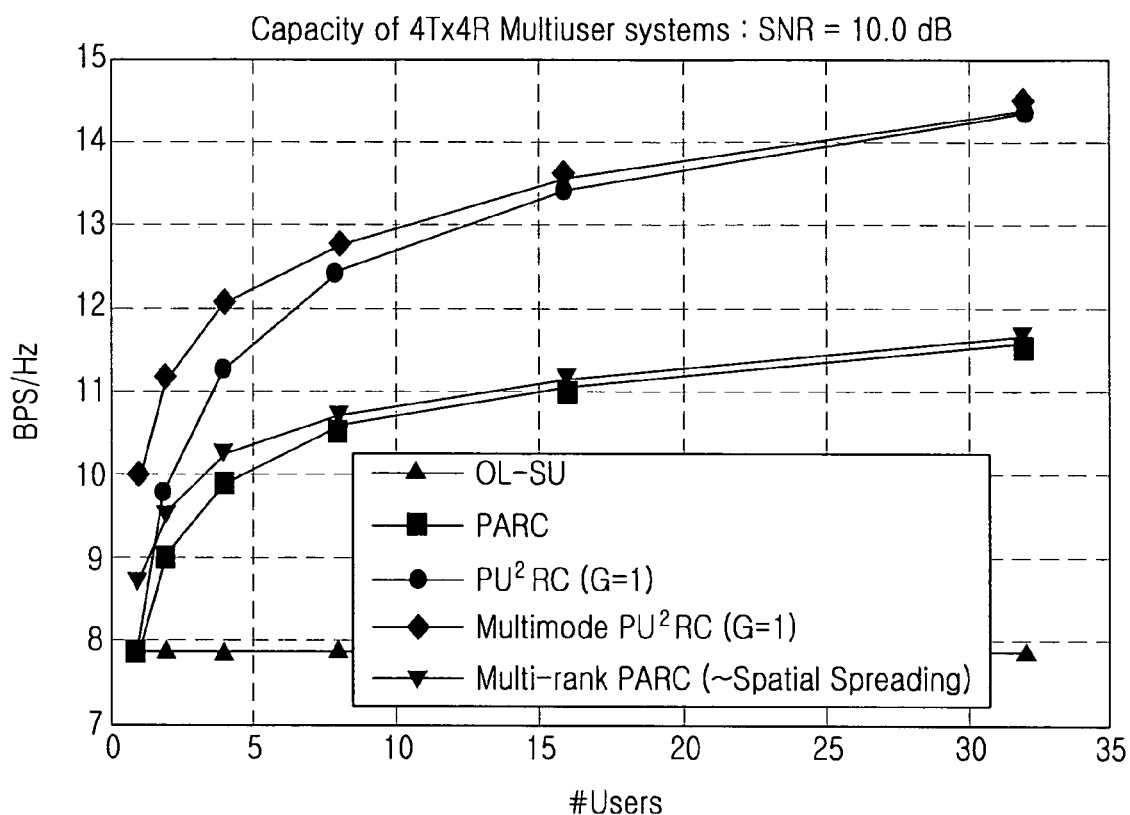
FIG. 5 is a graph illustrating data transmission efficiency according to number of users in another communication system in accordance with the present invention.

FIGS. 4 and 5 illustrate data transmission efficiency according to number of users in the communication system in accordance with the present invention. FIG. 4 is a graph illustrating the performance according to sum rate when a Signal to Noise Ratio (SNR) is 15.0 dB in an MIMO communication system of a multiuser environment with four transmit antennas and one receive antenna (4T×1R), i.e., in a communication system of a multimode PU²RC scheme. FIG. 5 is a graph illustrating the performance according to sum rate when an SNR is 10.0 dB in an MIMO communication system of a multiuser environment with four transmit antennas and four receive antennas (4T×4R), i.e., in a communication system of a multimode PU²RC scheme. For convenience of explanation, it is assumed that $G=1$ in FIGS. 4 and 5.

Referring to FIGS. 4 and 5, the conventional MIMO communication systems of open loop-single user (OL-SU) and per-antenna rate control (PARC) can provide service only to one user at a time. Thus, as the number of users increases, high gain cannot be obtained. A communication system of a conventional PU²RC scheme can obtain high gain when the number of users increases and cannot obtain high gain when the number of users is one or two. However, the communication system of the multimode PU²RC scheme in accordance with the present invention can obtain higher gain even when the number of users increases or is one or two, in comparison with other communication systems.

As is apparent from the above description, the present invention can obtain high diversity gain and improve system performance even when the number of MSs within a cell is variable by transmitting and receiving data after performing a scheduling process for excluding a rank related to a bad transmission/reception channel state between a transmitter, for example, a BS, and receivers, for example, MSs, in an MIMO communication system in a multiuser environment.

Although the exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A method for transmitting data at a receiver in a communication system, comprising the steps of:
    setting a number of sub-streams of each column of a selected precoding matrix among all precoding matrices of channels formed between the receiver and a transmitter;
    measuring channel states depending on sub-stream combinations whose number is equivalent to the number of set sub-streams and antenna combinations representing sub-streams used upon data transmission of all the precoding matrices; and
    transmitting channel state information corresponding to the channel states to the transmitter.

2. The method of claim 1, wherein the step of transmitting the channel state information comprises:
    transmitting the channel state information comprising channel quality information according to best channel states on a sub-stream-by-sub-stream basis.

3. The method of claim 1, wherein the step of transmitting the channel state information comprises:
    transmitting the channel state information comprising a mean value after computing the mean value between channel state values of two adjacent sub-streams among sub-streams for which the channel states have been measured.

4. The method of claim 1, wherein the sub-stream combinations comprise a number of sub-streams for transmitting the data and an index of a beam mapping matrix included in the sub-streams for transmitting the data, and the antenna combinations comprise index information of the selected precoding matrix set and a number of sub-streams used upon the data transmission.

5. A method for transmitting data at a transmitter in a communication system, comprising the steps of:
    receiving channel state information related to sub-stream combinations and antenna combinations from multiple receivers;
    scanning a maximum value of sub-streams from channel state values comprised in the received channel state information and computing all data transmission rates of the sub-streams; and
    transmitting data to the multiple receivers using a sub-stream combination index and a precoding matrix index after setting the sub-stream combination index according to a maximum transmission rate among all the computed data transmission rates of the sub-streams and setting the precoding matrix index according to the set sub-stream combination index.

6. The method of claim 5, wherein the sub-stream combinations comprise a combination of sub-streams according to each column of a selected precoding matrix among all precoding matrices.

7. The method of claim 5, wherein the antenna combinations represent sub-streams used upon data transmission in all precoding matrices.

8. The method of claim 5, wherein the step of transmitting data comprises:
    transmitting the data to the multiple receivers by mapping the data to a precoding matrix according to the set sub-stream combination index and the set precoding matrix index.

9. The method of claim 5, wherein the channel state information comprises channel quality information according to best channel states on a sub-stream-by-sub-stream basis.

10. The method of claim 5, wherein the channel state information comprises a mean value computed between channel state values of two adjacent sub-streams among sub-streams for which channel states have been measured in the multiple receivers.

11. The method of claim 5, wherein the sub-stream combinations comprise a number of sub-streams for transmitting the data and an index of a beam mapping matrix included in the sub-streams for transmitting the data, and the antenna combinations comprise index information of a selected precoding matrix set and a number of sub-streams used upon the data transmission.

12. A system for transmitting data in a communication system, comprising:
a receiver for setting a number of sub-streams of each column of a selected precoding matrix among all precoding matrices of channels formed between the receiver and a transmitter and measuring channel states depending on sub-stream combinations whose number is equivalent to the number of set sub-streams and antenna combinations representing sub-streams used upon data transmission of all the precoding matrices, and transmitting channel state information corresponding to the channel states to the transmitter.

13. The system of claim 12, wherein the receiver transmits the channel state information comprising channel quality information of best channel states on a sub-stream-by-sub-stream basis.

14. The system of claim 12, wherein the receiver transmits the channel state information comprising a mean value after computing the mean value between channel state values of two adjacent sub-streams among the sub-streams for which the channel states have been measured.

15. The system of claim 12, wherein the sub-stream combinations comprise a number of sub-streams for transmitting the data and an index of a beam mapping matrix included in the sub-streams for transmitting the data, and the antenna combinations comprise index information of the selected precoding matrix set and a number of sub-streams used upon the data transmission.

16. A system for transmitting data in a communication system, comprising:
a transmitter for receiving channel state information related to sub-stream combinations and antenna combinations from multiple receivers, scanning a maximum value of sub-streams from channel state values comprised in the received channel state information, computing all data transmission rates of the sub-streams, and transmitting data to the multiple receivers using a sub-stream combination index and a precoding matrix index after setting the sub-stream combination index according to a maximum transmission rate among all the computed data transmission rates of the sub-streams and setting the precoding matrix index according to the set sub-stream combination index.

17. The system of claim 16, wherein the sub-stream combinations comprise a combination of sub-streams according to each column of a selected precoding matrix among all precoding matrices.

18. The system of claim 16, wherein the antenna combinations represent sub-streams used upon data transmission in all precoding matrices.

19. The system of claim 16, wherein the transmitter transmits the data to the multiple receivers by mapping the data to a precoding matrix according to the set sub-stream combination index and the set precoding matrix index.

20. The system of claim 16, wherein the channel state information comprises channel quality information of best channel states on a sub-stream-by-sub-stream basis.

21. The system of claim 16, wherein the channel state information comprises a mean value computed between channel state values of two adjacent sub-streams among the sub-streams for which channel states have been measured in the multiple receivers.

22. The system of claim 16, wherein the sub-stream combinations comprise a number of sub-streams for transmitting the data and an index of a beam mapping matrix included in the sub-streams for transmitting the data, and the antenna combinations comprise index information of a selected precoding matrix set and a number of sub-streams used upon the data transmission.

* * * * *